United States Patent
Liu et al.

(10) Patent No.: US 7,736,764 B2
(45) Date of Patent: Jun. 15, 2010

(54) SURFACE ENHANCING COATING FOR GYPSUM-CONTAINING FLOOR UNDERLAYMENTS

(75) Inventors: Qingxia Liu, Vernon Hills, IL (US); John W. Ellicson, McHenry, IL (US); David McDonald, Glenview, IL (US)

(73) Assignee: United States Gypsum Company, Chicago, IL (US)

( * ) Notice: Subject to any disclaimer, the term of this patent is extended or adjusted under 35 U.S.C. 154(b) by 768 days.

(21) Appl. No.: 11/491,333

(22) Filed: Jul. 21, 2006

(65) Prior Publication Data
US 2006/0264548 A1    Nov. 23, 2006

Related U.S. Application Data

(62) Division of application No. 10/755,786, filed on Jan. 12, 2004, now Pat. No. 7,276,549.

(51) Int. Cl.
*B32B 13/00* (2006.01)
*B32B 7/12* (2006.01)
*C08K 3/28* (2006.01)
*C08K 3/30* (2006.01)

(52) U.S. Cl. ............... 428/703; 428/355 AC; 428/343; 428/500; 524/423; 524/429

(58) Field of Classification Search ........... 428/355 AC, 428/343, 500, 703; 524/423, 429
See application file for complete search history.

(56) References Cited

U.S. PATENT DOCUMENTS

| | | | |
|---|---|---|---|
| 3,947,398 A | 3/1976 | Williams | |
| 4,075,374 A | 2/1978 | Jorgenson et al. | |
| 5,032,225 A | 7/1991 | Saji et al. | |
| 5,491,209 A | 2/1996 | Helmer et al. | |
| 5,702,828 A | 12/1997 | Adler et al. | |
| 6,387,504 B1 | 5/2002 | Mushovic | |
| 6,406,779 B1 | 6/2002 | Carbo et al. | |
| 6,436,185 B1 | 8/2002 | Ayambem et al. | |
| 6,476,099 B1 | 11/2002 | Cimaglio et al. | |
| 6,593,417 B1 | 7/2003 | Anderson et al. | |
| 6,599,599 B1 | 7/2003 | Buckwater et al. | |
| 6,610,777 B1 | 8/2003 | Anderson et al. | |
| 6,623,791 B2 | 9/2003 | Sadvary et al. | |
| 6,635,341 B1 | 10/2003 | Barancyk et al. | |
| 6,663,979 B2 | 12/2003 | Deodhar et al. | |
| 6,689,460 B2 * | 2/2004 | Wen et al. ............. | 428/355 AC |
| 6,727,318 B1 | 4/2004 | Mathauer et al. | |

* cited by examiner

*Primary Examiner*—Vickey Nerangis
(74) *Attorney, Agent, or Firm*—Greer, Burns & Crain, Ltd.; David F. Janci, Esq.; Pradip Sahu, Esq.

(57) ABSTRACT

A coating for preparing a floor underlayment to receive an adhesive includes a water-soluble, latex polymer, a defoamer and a dual-function surface enhancing agent. The surface enhancing agent includes a set accelerator that also functions to cross link the adhesive, hardening the surface of the underlayment using at least two mechanisms. One embodiment of the invention is a dry mixture that forms a coating when added to water. The dry mixture includes from about 10% to about 50% of the redispersible polymer by weight based on the mixture, from about 50% to about 90% of the surface enhancing agent and from about 0.15% to about 0.25% of the defoamer by weight based on the mixture. Other embodiments describe a liquid coating formed by adding from about 1 to about 8 parts water to 1 part of the dry mixture by volume based on the mixture.

9 Claims, 6 Drawing Sheets

SURFACE ENHANCING COATING FOR GYPSUM-CONTAINING FLOOR UNDERLAYMENTS

CROSS REFERENCE TO RELATED APPLICATION

This application is a divisional application of U.S. Ser. No. 10/755,786, filed Jan. 12, 2004 now U.S. Pat. No. 7,276,549.

BACKGROUND

This invention relates to an improved coating for a gypsum-based floor underlayment and a method of preparing it. More specifically, the coating provides a harder surface for the floor underlayment and promotes better adhesion of the coating to the underlayment surface.

Gypsum-based building materials are useful in the building industry in a number of applications. The materials are prepared by mixing a slurry made of calcium sulfate hemihydrate (also known as calcined gypsum, plaster of paris or calcium sulfate semihydrate) in water and pouring it into a mold, forming a panel or floor underlayment, or making the slurry into any appropriate shape. Water reacts with the hemihydrate to form an interlocking matrix of calcium sulfate dihydrate (also known as gypsum) crystals, causing the slurry to set and harden. Ideally, when an aggregate is present in the slurry, it is evenly dispersed through the matrix, adding strength and hardness to the resulting matrix layer. Excess water is allowed to evaporate or is driven off by drying the gypsum product. Gypsum is less expensive, lighter weight and faster setting than concrete. The sound reduction and fire retarding properties of gypsum materials are superior to those of wood or other cellulosic building materials.

When used as a floor underlayment, gypsum-containing compositions are coated with a sealant. A mastic or adhesive is then applied to the sealant, and flooring is applied to the mastic. The flooring materials include vinyl, linoleum, and other floor coverings that are glued directly to the underlayment.

However, gypsum-based floor underlayments are not universally acceptable due to soft surface characteristics and the presence of powder or dust at or near the surface of the underlayment. Under some circumstances, the dihydrate matrix layer with the aggregate substantially dispersed therein, is topped by a powdery layer that forms on top of the matrix layer. At the surface, the dust is unsightly and inconvenient to remove. When located just below a surface crust, small amounts of wear cause the surface crust to break, exposing the powdery layer. Even if time and expense is invested in removal of the powdery layer, the resulting underlayment has an uneven surface.

Formation of the powdery layer has been observed when extreme retarders, such as polycarboxylates, are used in the underlayment. Set retarders are frequently used in the slurry composition to lengthen the time that the slurry is workable, known as the open time. Increasing the open time provides the installers additional time to pour the floor, level it and screed it before the extent of the setting reactions prevent working of the surface. In this case, analysis shows the powdery layer is primarily a mixture of unreacted calcium sulfate hemihydrate and calcium sulfate dihydrate.

Polycarboxylates are known to set retarders but also improve the flowability of the calcium sulfate hemihydrate slurry, providing a pourable and/or self-leveling composition using less water. Decreasing the amount of water in the slurry increases the strength of the product and reduces drying time. The benefits of using polycarboxylates in flooring underlayments are disclosed in co-pending Patent Cooperation Treaty PCT/US03/09400, filed Mar. 27, 2003, designating the United States of America and entitled, "High Strength Flooring Compositions," herein incorporated by reference in its entirety.

However, the problem of unreacted calcined gypsum is not limited to cases when retarders are used. Environmental conditions, such as wind, result in increased surface drying. Overwatering of the slurry allows separation of the aggregate and the gypsum matrix before the setting reactions are complete. Yet another example of a situation that results in unreacted calcium sulfate hemihydrate is where there is a change in raw materials. If the aggregate is changed from a wet sand to a dry sand, the effective amount of water in the slurry is reduced and in some cases is insufficient to react all of the hemihydrate. Thus, the problem of finding unreacted calcium sulfate hemihydrate at the surface of a gypsum-based floor underlayment is not uncommon and can occur in a variety of situations.

Conventional methods of treating underlayment surfaces fail to cure the problem of unreacted hemihydrate. Merely spraying water on the powdery layer is not sufficient to hydrate a significant portion of the unreacted hemihydrate. Application of conventional topcoating materials, such as TOPSEAL (United States Gypsum Company, Chicago, Ill.), temporarily seals the dust between the coating and an interlocking matrix of calcium dihydrate crystals, but does not provide a long-term solution to this problem. When the powdery layer forms under the surface crust, the coating layer adheres to the crust as it dries, but the coating and attached crust easily peal away from the underlying matrix layer because the powdery layer does not attach the crust to the strong matrix layer. In places where the powdery layer is thin, the coating can penetrate through the powdery layer to bond to the dihydrate matrix structure in isolated places. However, isolated bonds may not be strong enough to hold the coating in place over the entire surface. As the coating over the unbonded areas pulls and shifts under normal use, the bonded areas are pushed and pulled in many directions by movement of the coating. Changing pressures can cause the small patches of bonded gypsum to break up, eventually causing delamination of all or of large portions of the coating.

Another method of combating this problem would be through the use of additives to the calcined gypsum slurry. However, this technique requires that one accurately guess in advance the amount of the powdery layer that will appear as the underlayment sets. Variables such as wetness of the aggregate, wind conditions, temperature, type and amounts of set retarders used would have to be considered, resulting in a complex algorithm for determining if such additives would be necessary. If the amount of unreacted calcium sulfate hemihydrate differed from the predicted amount, or if conditions changed in the middle of the job, the amount of the additive would have to be reconsidered, requiring reevaluating all of the above variables. This could lead to a lengthy and complex process that installers will not want to use.

Thus, there is a need in the art for a coating to strengthen the surface of a floor underlayment, especially when the underlayment has a powdery layer at or near its surface. The coating should also react with unreacted calcium sulfate hemihydrate to improve the strength of the powdery layer. The coating should be easy to apply using commonly available tools or methods.

SUMMARY OF THE INVENTION

These and other benefits are found in the coating of the present invention. The coating promotes hydration of the unreacted calcium sulfate hemihydrate to form an interlocking matrix of calcium sulfate dihydrate, as well as providing a strong, stable surface for adhesion of mastic or adhesives for subsequent floor coverings such as vinyl or linoleum that are installed on top of the coating.

More specifically, this coating includes a film-forming polymer, a defoamer and a dual-function surface enhancing agent. The surface enhancing agent includes a salt that acts as a gypsum set accelerator but also functions to cross link the mastic that is subsequently applied, enhancing the surface of the underlayment by at least two mechanisms. One embodiment of the invention is a dry mixture that forms a coating when added to water. The dry mixture includes from about 10% to about 50% of the redispersible polymer by weight based on the mixture, from about 50% to about 90% of the surface enhancing agent and from about 0.15% to about 0.25% of the defoamer by weight based on the mixture. Other embodiments describe a liquid coating formed by adding from about 1 to about 8 parts water to 1 part of the dry mixture by volume based on the mixture.

A coated floor underlayment is formed by coating an uncoated floor underlayment containing gypsum with the coating including water, the film-forming latex polymer, the surface enhancing agent and the defoamer. After the coating has been applied and dried, a multi-layer floor underlayment is formed that includes a matrix layer that includes aggregate particles dispersed in a crystalline matrix of calcium sulfate dihydrate, and a surface layer that includes calcium sulfate hemihydrate, the polymer and a salt dispersed in a calcium sulfate dihydrate matrix.

A method for strengthening the surface of a gypsum-based floor underlayment includes providing a set and dried floor underlayment. After selecting a redispersible polymer and surface enhancing agent, the polymer and the surface enhancing agent are blended with a defoamer to form a mixture. At the time of application, the mixture is combined with water at a ratio of from about 1:1 to about 1:8 by volume, then mixed to form a liquid coating. The coating is then applied to the surface of the floor underlayment and allowed to dry.

Because the coating of the present invention is applied to the set gypsum-based underlayment, there is no need to guess whether or not the powdery layer will form or if so, how much unreacted calcium hydrate will be present. Added chemicals and expense need not be added to the slurry if the powdery layer does not form. Only after the underlayment is substantially set, and it is known whether or not the powdery layer forms, is it necessary to make a decision as to whether or not to treat the powdery layer. If no powdery layer forms, a more conventional coating is usable to seal the underlayment, or no coating at all need be used on the floor. When it is necessary to treat the powdery layer, more information is available to decide on the exact coating composition or whether it would be advantageous to apply multiple coating layers.

The dual-functionality of the coating treatment results in a surface that is significantly harder and has better adhesion between the solid layer of aggregate-containing calcium sulfate dihydrate matrix and the mastic. Because the coating is more firmly anchored to the strong aggregate layer, it provides a more stable surface to which the mastic for vinyl or other flooring products to adhere. Action of the surface hardener works in two ways. First, it promotes hydration of the unreacted calcium sulfate hemihydrate, building a more extensive matrix of interlocking crystals of calcium sulfate dihydrate within the powdery layer. This matrix adds considerable strength to the powdery layer with this three-dimensional structure, and increases occurrences where the dihydrate matrix spans the entire powdery layer to tie in to the dihydrate matrix of the aggregate layer to the coating film.

Secondly, presence of the metal salts improves bonding of the mastic to underlayment surface. Surface analysis suggests that metal salts form in a surface layer. It is theorized that when the mastic is applied these surface salts promote cross-linking of the mastic and interfacial bonding between the mastic and the newly forming gypsum matrix. Cross-linking of the mastic makes it harder, while increasing the number of chemical bonds between the mastic and the gypsum matrix improves the adhesion at the interface. Regardless of the mechanism, bonding of the mastic to the underlayment is improved.

The coating of the present invention is easy for contractors to use. It is available in a dry powder form that has a long shelf life and is lightweight to carry to a job site. It is mixed with water on site on a volume basis. The coating is applied using standard coating techniques, without any special equipment. No complex process is needed to determine the amount of coating to be used and the coating provides an improved surface even if the powdery layer does not form on the surface of the underlayment.

DETAILED DESCRIPTION OF THE DRAWINGS

DETAILED DESCRIPTION OF THE INVENTION

Figure 1:
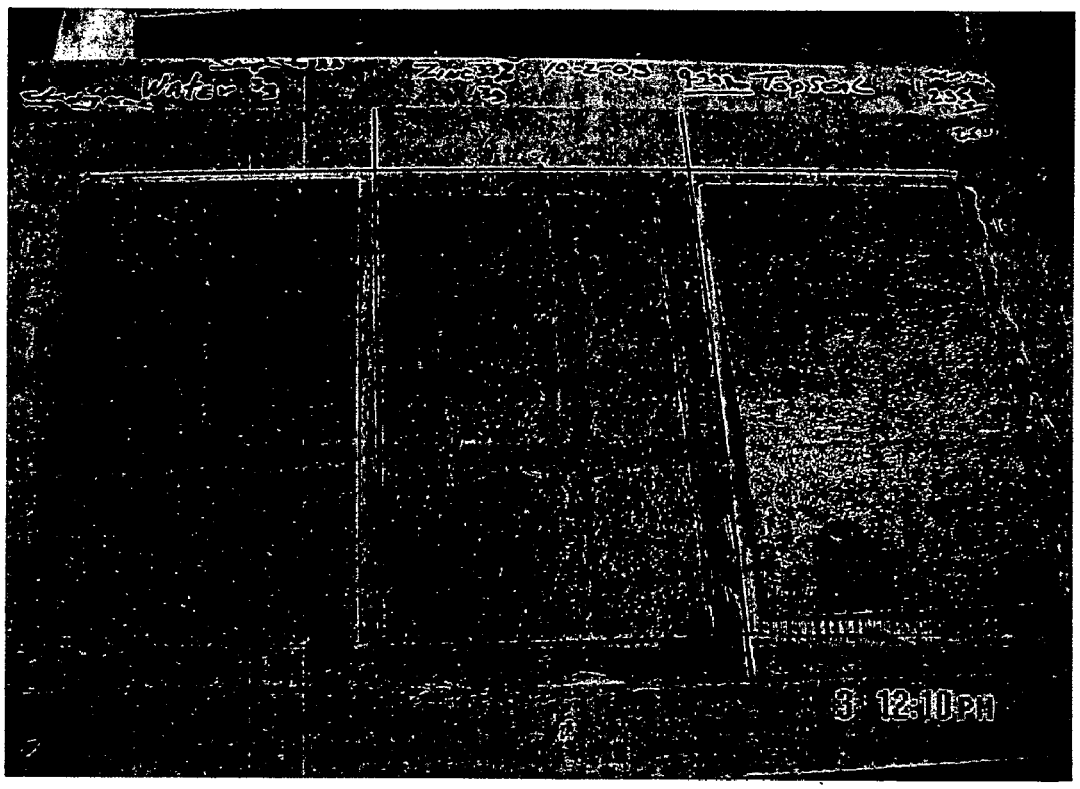
FIG. 1 shows three samples of vinyl flooring on Test Panel 1 prepared according to Examples 1-3.

The present invention is directed to a coating or coating mixture for a floor underlayment and a floor treated with the subject coating. The coating or coating mixture for a floor underlayment of the present invention includes a film-forming latex polymer, a surface enhancing agent selected to both accelerate the setting reactions of calcined gypsum and to form a surface layer that bonds strongly with mastic; and a defoamer. Although water is necessary for application of the coating to the floor underlayment, a coating mix is advantageously supplied in the form of a dry powder with instructions that water be added just prior to application of the coating to the underlayment. In another embodiment, the coating is ready-mixed with water and is supplied ready for application. It is to be understood in the following discussion that, although the coating mixture is not always mentioned, the coating is readily obtainable by combining the coating mixture with water. It is further contemplated that the choice of raw materials is not limited to dry powder forms when a liquid coating or concentrate is prepared directly.

One component of the coating is the redispersible latex polymer. The polymer forms throughout the new calcium sulfate dihydrate matrix, providing a hard and stable surface to which the mastic adheres, binding subsequent flooring layers to the underlayment. Any redispersible latex polymer is contemplated for use in this coating that is compatible with the surface enhancing agent and that enhances the interaction between the surface enhancing agent and the mastic. Examples of useful latex polymers include polyacrylates, polymethacrylates, styrene-butadiene copolymers, vinyl acetate co-polymers, vinyl chloride co-polymers, polybutadienes, and polyisoprenes. Polyacrylic resins and vinylacetate copolymers are preferred resins. Especially preferred resins are vinylacetate ethylene copolymer and vinylacetate-vinylveresatate copolymers, particularly ELOTEX Flowkit 51 (National Starch Co., Chicago, Ill.). Use of any particular structures, including homopolymers, copolymers, terpolymers and the like, is contemplated.

The polymer is compatible with the surface enhancing agent if it does not react with the surface hardening agent in the liquid phase. If the polymer and the surface hardening agent react to form a precipitate or insoluble species, then the original chemical species will not be present when the coating is applied to the floor underlayment. Any precipitate or new species formed would further alter the reactions that take place when the coating is applied. The chemical reactions should begin when the coating contacts the powdery layer. Hydration of the calcium sulfate hemihydrate absorbs water and water is lost to evaporation at the surface. As the amount of available water decreases, the latex begins to coalesce and salts formed by the surface enhancing agent begin to salt out. Progress of all of these events simultaneously creates a matrix of interlocking calcium sulfate dihydrate crystals, having the latex polymer, precipitated salts and unreacted calcium sulfate hemihydrate dispersed through the matrix.

Another consideration in selecting the polymer is its ability to enhance the interaction between the surface enhancing agent and the mastic or flooring surface that is subsequently applied. If the polymer forms a continuous film between the underlayment and the mastic or flooring surface, the surface enhancing agent will not contact the mastic to promote crosslinking, as discussed below. The type and amount of latex polymer are selected so that at least some discontinuities exist in the polymer film to expose crystals of the surface hardening agent, enhancing contact and interaction between the layers.

Any effective amount of the polymer is useful in this coating. An effective amount is one that does not react with the surface enhancing agent in the liquid phase and enhances interaction between the surface enhancing agent and the mastic or flooring. Preferably the amount of polymer is from about 10% to about 40% based on the weight of the mixture. Polymer concentrations of about 15% to about 25% are more preferred.

The surface enhancing agent is used to strengthen the surface of the underlayment, prevent peeling of the coating after it is dry and promote bonding with the mastic that is subsequently applied. It functions to accomplish these goals in two ways. First, it acts as a set accelerator to hydrate the unreacted calcium sulfate hemihydrate in the powdery layer. The calcium sulfate hemihydrate that remains unreacted after the underlayment has set resists hydration so that application of plain water to the powdery layer results in negligible additional hydration. When recommended amounts of the surface enhancing agent are used, about 30% of the calcium sulfate hemihydrate reacts further to form calcium sulfate dihydrate. This extent of reaction forms a sufficient-member of calcium sulfate dihydrate crystals to bond the coating to the underlying matrix layer.

The second function of the surface enhancing agent is enhanced bonding of the coating of the mastic. A gypsum set accelerator that does not also enhance bonding with the mastic is ineffective as the surface enhancing agent. Cross-linking of the mastic attaches it to the forming dihydrate matrix and increases its molecular weight, making it harder and more resistant to delamination. Free radicals or metal ions are known for use as cross-linkers.

The concentration of the surface enhancing agent in the coating mix is preferably from about 50% to about 90% by weight based on the mixture. More preferably, the concentration is from about 75% to about 85%. When low concentrations of surface enhancing agent are used, the amount of coating applied is increasable, if desired, to maintain a relatively constant conversion of calcium sulfate hemihydrate.

Any substance that performs both of these functions is usable as the surface enhancing agent. Compounds that have been found to be most useful are ionic in nature. Metallic cations are used to promote cross-linking of the mastic. The cation is preferably multivalent, especially a divalent or trivalent ion. Divalent or trivalent metal ions, such as zinc, magnesium, copper, aluminum, ferrous or ferric ions are particularly preferred. Monovalent cations, such as potassium or sodium appear to have lower activity, but are useful when the surface enhancing agent is present in the higher concentrations in the liquid coating.

Any anions that are known as set accelerators, including sulfates, nitrates and chlorides, are contemplated for use in the coating. Preferred salts include, but are not limited to, potassium sulfate, sodium sulfate, magnesium sulfate, copper sulfate, ferrous sulfate, ferric sulfate and aluminum sulfate. Salts having multiple cations, including sodium hydrogen sulfate or potassium hydrogen sulfate, are expected to be useful as well. Zinc sulfate is a particularly preferred surface enhancing agent, but use of any material that serves the dual functions described above is contemplated for use in this coating. Oldbridge Zinc (Harcos Chemicals, Bellesville, N.J.) or SUPER TEL Zinc (Tetra Micronutrients, Fairbury, Nebr.), are preferred sources of high purity grade zinc sulfate.

The defoamer is used to reduce the foaming that occurs when the dry components are mixed with water. Any defoamer that is readily available and does not adversely interact with other components is usable. AGITAN P 823 (Ultra Additives, Inc. Paterson, N.J.) is a preferred defoamer and is available in a powdered form. The defoamer is most useful in the coating in concentrations of about 0.15-0.25% based on the weight of the mixture. Preferably, about 0.19 to about 0.21% defoamer is used on a mixture weight basis.

Water is used as a solvent for the coating and to hydrate the calcium sulfate hemihydrate. A sufficient amount of water is one that hydrates the reacting calcium sulfate hemihydrate, disperses the polymer, dissolves the surface enhancing agent and forms an emulsion having the flowability to coat the underlayment and allow the polymer to coalesce into a film. Use of additional water over the sufficient amount thins the coating and makes it more flowable, but also adds to the drying time. The maximum amount of water is controllable by the time available to allow the coating to dry in anticipation of applying an adhesive or adjacent flooring layer. When a coating of a certain thickness is desired, more total coating is required when the coating is diluted-compared to a coating using a lesser amount of water.

In a preferred embodiment, the polymer, defoamer and surface enhancing agent are supplied premixed in dry form. At the job site, the water is added to the dry coating mix to prepare the coating. Preferably, the volume of water added is at least equal to the volume of the dry coating mix. In some embodiments, the ratio of the volume of coating mix to water is from about 1:1 to about 1:8. More preferably, water is used in a volume ratio of from about 1:3 to about 1:5 or at a ratio of about 1:4. The same ratios of water to dry mixture are useful when the water is added at the time of manufacture to a ready-mix formulation. Manufacture of a ready-mix concentrate is also contemplated, whereby a portion of the water is added at the time of manufacture and another portion of the water is added just prior to application. The concentrate is expected to be more economical by reducing the cost of shipping and storing large quantities of water.

It is also contemplated that multiple treatments be used to further increase the portion of calcium sulfate hemihydrate in the powdery layer that is hydrated. If the polymer film does not form a water barrier, application of additional coating penetrates the film to react additional calcium sulfate hemihydrate. Treatments are repeatable until a sufficient amount of calcium sulfate hemihydrate is converted, or until a sufficient layer of polymer has built up to form a film that is impenetrable by the coating solution.

After one or more treatments with the surface enhancing coating, the nature of the coating surface is changed. The powdery layer becomes a "surface layer." When the mastic is applied, this surface layer acts as a transition layer between the matrix layer and the mastic to hold the flooring in place. When the coating is applied to the powdery layer, calcium sulfate hemihydrate begins to absorb water of hydration to form an interlocking matrix of calcium sulfate dihydrate crystals. Upon application, water also begins to evaporate from the surface of the underlayment. As the water evaporates or becomes associated with gypsum molecules, the liquid becomes more concentrated. Disappearance of the water causes the polymer to coalesce and begin to form and the ions from water impurities and the surface enhancing agent begin to salt out.

Salts that form will be composed primarily of the ions of the surface enhancing agent. However, other ions present will also form salts as the liquid becomes too concentrated to hold everything in solution. In some areas, the water is likely to have hard water ions, including calcium and magnesium. Other locations have rust as a common water component. Inclusion of salts of these ions with the surface enhancing agent is unlikely to be detrimental, and can actually improve cross-linking of the mastic.

As more and more water is absorbed or evaporated, several events are taking place at once. The salts are precipitating out at the same time the polymer is coalescing and forming. Substantially simultaneously, the matrix of dihydrate gypsum is developing. As there are no forces acting to separate the components as these events are taking place, the gypsum matrix forms with the polymer, salts and unreacted calcium sulfate hemihydrate dispersed through the matrix. The newly formed dihydrate matrix also interlinks with the dihydrate matrix of the matrix layer, bonding the two layers and reducing the tendency for interfacial separation.

A number of optional components are added to the coating when it is desirable to impart specific properties to the coating. Any additive conventionally used with either the underlayment or the coating that does not adversely react with the required components is contemplated for use in the surface enhancing coating.

Certain optional additives are preferably used when the coating is manufactured in a liquid emulsion or ready-mix form. For example, the addition of an antifreeze is preferred, such as propylene glycol, ethylene glycol or any other material that does not adversely effect other components. Any useful amount of antifreeze is contemplated, but it is preferably used in amounts of from about 0.5% to about 3%. More preferably, antifreeze is added in amounts of from about 0.8% to about 1% by weight based on the mixture.

The addition of a biocide is also highly preferred in ready-mix formulas. Any biocide is expected to be useful in the present coating unless it interacts with other components of the mixture. A preferred biocide is KATHON LX 1.5 (Rohm & Haas, Bristol, Pa.). This biocide is especially preferred when used in amounts of from about 0.1% to about 0.2% by weight based on the mixture.

Use of a wetting agent is optional, but highly preferred. Preferred wetting agents include nonyl phenol, Igepal CO-660 and CO-630 (GAF Corporation, Wayne, N.J.) and Tritron X-100 wetting agent (Rohm & Haas, Bristol, Pa.). Suitable wetting agents are also made by Rhone-Polonc and other makers of wetting agents and detergents. The wetting agent is preferably used in amounts of less than 1% by weight based on the mixture. More preferably, the wetting agent is present in amounts of about 0.2% to about 1%, and even more preferably about 0.5% by weight based on the mixture.

Strength enhancers are optionally added to strengthen or reinforce the matrix of calcium sulfate dihydrate that forms when the hemihydrate undergoes hydration. Suitable enhancers for dimensional stability and resistance to permanent deformation are disclosed in U.S. Pat. No. 6,632,550, herein incorporated by reference in its entirety. Strength enhancers described-therein include condensed phosphoric acids, each of which has 2 or more phosphoric acid units and salts or ions of condensed phosphates, each of which has 2 or more phosphate units. Any additive that does not adversely effect other components is contemplated for use here, but sodium trimetaphosphate is the most preferred. Preferably, the strength enhancer is added in amounts ranging from about 0.004% to about 2% based on the weight of the mixture, and more preferably in amounts of less than about 0.1%, or amounts of about 0.08%.

A mildewcide is a recommended additive in either the dry mix or liquid coating form. Pyrithiones, such as sodium OMADINE or zinc OMADINE (Arch Chemicals, Norwalk, Conn.), are preferred mildewcides, although it is contemplated that any mildewcide that does not adversely interact with other components is usable in this coating. Preferably, the mildewcide is present in amounts ranging from about 0.03% to about 0.05% by weight based on the mixture.

To assist in determining whether an underlayment has been treated or that treatment was complete, a visual indicator is optionally added to allow for visual confirmation that the coating has been applied. Pigments, optical brighteners and pH indicators are preferred, but any other type of visual indicator is usable.

A visible color change is imparted to the coating when pigments are added, and that color change is visible on the underlayment to which the coating has been applied. Pigments or dyes are also useful for aesthetic purposes. Typically they take the form of powders, flakes, organic or organometallic molecules and the like. Examples of suitable pigments or dyes include iron oxide, other metal oxides, titanium dioxide and carbon black.

Optical brighteners are fluorescent white dyes, commonly present in laundry detergents, that absorb ultraviolet "UV" light and fluoresce in the blue region of the visible spectrum. When added to a coating, no obvious color change occurs, but the fluorescence is detectable in the presence of UV light. Thus, shining an ultraviolet light over an underlayment allows the owner or installer to verify that the underlayment has been treated and that coverage was complete, without imparting a particular color to the underlayment. Optical brighteners, such as TINOPAL SFP (Ciba Specialty Chemicals, Tarrytown, N.Y.) are preferred visual indicators.

Indicators that temporarily change color due to changes in pH are also suitable for determining where the coating has been applied. For example, applying ammonia other basic solution over a coating that includes phenolphthalein would cause the coating to change from colorless to red. Any pH indicator that does not adversely interact with other components of the coating is usable in this embodiment, including those that change color in the presence of acid.

Appropriate amounts of the indicator depend on the type of indicator selected. Any amount of indicator is useful that produces a noticeable color change but does not adversely effect other components of the coating composition. Preferably, the visual indicator is added in amounts of from about 0.03% to about 2% by weight based on the mixture. When pigments are used, amounts at the higher end of the range are expected to be most satisfactory. Only small amounts of optical brighteners are needed, and are usable in amounts near the lower end of the preferred range.

In some embodiments of the invention, the coating is applied to a suitable gypsum-containing floor underlayment. The term "underlayment" is intended to refer to any material that raises or supports flooring that is attached or mounted to it. Preferably the underlayment includes gypsum, cement or mixtures thereof, but any underlayment having a relatively soft surface, including wood, clay, and the like, is likely to benefit from application of this coating. Gypsum is preferably present in the underlayment in amounts from about 50% to about 95%. The underlayment is typically supplied in panels or a gypsum-based slurry is poured directly into the space to be occupied by the underlayment and allowed to set in place. However, the form by which the underlayment is supplied is unimportant and any form is usable with the coating of this invention.

A preferred underlayment for use with this coating is made from a mixture to be used in conjunction with water for preparing a slurry that hydrates to form a high strength flooring compound. The mixture includes from about 30% to about 98% by weight calcium sulfate hemihydrate, having at least 25% of the calcium sulfate hemihydrate in either the alpha-calcined form, the beta-calcined form or a combination thereof. A polycarboxylate dispersant is included in the mixture in amounts from about 0.2% to about 10% by weight. The mixture also includes 0.05-50% by weight of either cement or lime. When combined with water in amounts of about 10% to about 50% water based on the weight of the dry flooring mixture, a slurry is formed that is useful as a flooring composition. This underlayment composition is disclosed in Patent Cooperation Treaty PCT/US03/09400, previously incorporated by reference.

Any mastic or adhesive is useful with this coating that includes at least one component cross-linkable by the surface enhancing agent. Optimum surface hardness is obtained when conversion of unreacted hemihydrate to dihydrate and cross-linking of the mastic both occur. Any component of the adhesive that is available to react with the coating surface to cross-link the adhesive is useful in this invention.

Flooring adhesives used for vinyl sheet goods installations usually include a tackifying resin and solids, with optional inorganic fillers. The tackifying resin, which is usually proprietary, increases initial adherence of the adhesive to the flooring. The solids are preferably an intimately blended mixture of high molecular weight latex polymers characterized by having at least 50 percent by weight solids and an inorganic filler. Adhesives containing acrylic type latex polymers are preferred because the polymer reacts with metal ions such as zinc, copper, and aluminum to cross-link the mastic through the formation of metal-acrylate complexes.

In other preferred adhesives, a cross-linkable stabilizing colloid is optionally added for in-can and mechanical stability. In the case the of styrene-butadiene rubber (SBR) type adhesive, the stabilizing colloid will also react with zinc, copper, and aluminum ions through metal-carboxylate complexes.

Thus, the floor underlayment treated with the coating of this invention, having metal ions such as zinc on the surface layer, will react with these adhesives to cross-link one or more components of the adhesive through the formation of metal-polymer complexes. Commercially available adhesives such as Congoleum 3044 (Congoleum, Mercerville, N.J.), Mannington V-31 (Mannington Mills, Salem, N.J.), Armstrong S-254 (Armstrong World Industries, Inc., Lancaster, Pa.), and Tarket FB-1 (Tarket Floors, Johnson City, Tenn.), are useful with the coating of this invention for enhancing the adhesion between adhesive and floor underlayment.

The coating mix is made by combining dry ingredients and blending them. In a preferred embodiment, a dry coating mix is prepared by mixing a dry, redispersible polymer, a powder defoamer and a dry surface enhancing agent. These components are preferably blended until a substantially uniform dry mixture is obtained. Optional components are also added and blended into the mixture. The mixture is then optionally packaged and sold in the dry form.

At the job site, the coating is prepared by mixing the dry coating mixture with water. Preferably the dry powder is slowly added into an appropriate quantity of moving water and mixed for at least one or two minutes. The solution is preferably allowed to rest for about 15 minutes, then remixed for an additional 1-2 minutes. The mixing method is not important, stirring with a paddle by hand or mixing with a mechanical device are equally effective in producing a high quality coating.

Liquid ready-mix formulations have the water added prior to packaging and distribution. They are generally more expensive than a dry coating mix because the water is packaged, shipped and stored with the other components. However, in some situations, such as when very small quantities are used, or when suitable water is not available at the job site, paying a premium for a ready-to-use coating is justifiable. The same technique for mixing the ingredients is used as for the dry coating mixture, except that the packaging and distribution of the product takes place after the coating is finished and ready-to-use. Preparation of a ready-mix concentrate is also contemplated that is a liquid form, but has less water than the ready-mix product. The concentrate is reconstitutable in a manner similar to the dry mixture, by adding the concentrate to a sufficient amount of water for optimum dilution and mixing thoroughly. Whether the coating is prepared from a dry mix at the job site, or prepared at a plant and sold in a ready-mix form, it is preferable to stir the coating just prior to application to obtain a substantially uniform consistency.

The coating is applied to the set and dried underlayment by any known coating method. Preferred methods of application include spraying, rolling, mopping, squeeging, backrolling, pouring, trowelling, brushing, or otherwise coating the surface of the substrate. Combinations of these techniques are also useful, such as spraying the coating to distribute it then brushing the coating to obtain a more uniform finish.

Thickness of the coating often depends on the particular substrate, the coating composition and the degree of surface hardness desired. Preferably the coating is applied to achieve a coating weight of 10-14 grams coating per square foot. Thicker or thinner coatings are also useful under particular circumstances. For example, thicker applications of the coating are beneficial where the substrate is rough or uneven, where the powdery layer is particularly thick, or if the coating solution is dilute.

Following application, the coating is allowed to dry prior to application of additional flooring layers such as adhesives, mastic or vinyl flooring. Upon drying, the coating composition coalesces to form a film. Preferably, the coating is allowed to dry at least 2 hours, more preferably at least 4 hours, to assure adequate drying. Longer or shorter drying times are suitable depending on the coating thickness, the ambient temperature and humidity, and the amount of water present in the coating. The maximum drying time is limited only by the time available before the final flooring is laid.

This coating is useful alone or together with other coatings or waterproofing systems. Conversion of unreacted calcium sulfate hemihydrate occurs only when the coating composition comes in contact with the coating solution. When the powdery layer is present, it is advantageous to position the present coating adjacent the powdery layer. Where a water barrier is needed, the use of a conventional sealant between the subject coating and the mastic is contemplated.

In the discussion above and in the examples that follow, all ranges expressed in percentages are based on the weight of the dry components present in the coating. Water addition is measured in terms of volumes of water per volume of dry components. The examples are not intended to be limiting of the invention, but merely to demonstrate making and use of some of the embodiments described herein.

EXAMPLES 1-3

Test panels of LEVELROCK LR2500 (USG Corporation, Chicago, Ill.) were prepared for testing of coating preparations. Plywood molds one foot square and one inch deep (30 cm×30 cm×2.5 cm) were prepared by priming them with USG Underlayment Primer (USG Corporation, Chicago, Ill.). LEVELROCK LR2500 Underlayment was mixed according to the manufacturer's directions and cast into the molds. The samples were allowed to air-dry for about four weeks, or until they achieved a constant weight. The sample was divided three equal test areas in one direction, each test area being approximately 4"×12" (10 cm×30 cm). Several strips of vinyl sheet flooring were cut, each to fit within the test area.

Three comparative examples were prepared testing the components used in this invention separately. Water alone was tested alone to see if it would hydrate a sufficient amount of the unreacted hemihydrate to form a stable dihydrate matrix. Zinc sulfate and latex polymer, in the form of TOPSEAL coating (USG Corporation, Chicago, Ill.), were each tested separately. Compositions of each of these examples is shown in TABLE I:

TABLE I

| | Example | | |
|---|---|---|---|
| | 1 | 2 | 3 |
| Position on Test Panel 1 | Left | Center | Right |
| Coating Type | Water | Zinc Sulfate | TOPSEAL |
| Coating Weight | 3 grams | 3 grams | 3 grams |
| Polymer | 0 | 0 | 89.07% dry Wt. |
| Zinc Sulfate | 0 | 100% dry Wt. | 0 |
| Water added to dry ingredients | 100% | 67% by Wt. | 80% by Vol. |

TOPSEAL is a commercially available sealant for floor underlayments. In addition to the required components, the commercial formula used in Examples 3 and 4 is a liquid concentrate that also includes a small amount of water. The complete composition of the USG TOPSEAL formulation is shown in Table II.

TABLE II

TOPSEAL COMPOSITION

| Component | Source | % Wt. |
|---|---|---|
| Rhoplex 8764L | Rohm & Haas Co. (Philadelphia, PA) | 89.1 |
| Propylene Glycol | | 0.92 |
| Kathon 1.5 | Rohm & Haas Co. | 0.20 |
| Skane M-8 | Rohm & Haas Co. | 0.16 |
| DeFoo 542 | Ultra Additives Co. | 0.28 |
| CO-630 | Rohm & Haas Co. | 1.22 |
| Water | | 8.2 |

The comparative example of test area 1 was coated with approximately three grams of water and allowed to dry. Test area 3 was coated with three grams of commercially available TOPSEAL coating that was prepared by mixing in a 1:4 ratio with deionized water by volume. TOPSEAL is a polymeric coating having minor amounts of standard additives such as defoamers, wetting agents, biocides, etc., but no surface enhancing agent. Test area 2 was coated with an aqueous solution of a zinc sulfate, a surface hardening agent. For each example, the coatings were applied to the surface of the underlayment with a brush. The loading of the coating on the underlayment surface was 12 grams per square foot (129 $g/m^2$) or approximately three grams of coating within each test area. Each of the coatings was allowed to dry thoroughly, at least 2 hours, before the test proceeded.

Following application of the coatings, mastic was uniformly applied to the coatings with a 1/16" (1.6 mm) square-notched adhesive trowel held at a 45° angle. Use of the adhesive trowel results in the mastic being applied in a series of parallel channels of uniform thickness at a rate of 34.7 grams mastic/$ft^2$ (374 $g/m^2$). The samples of vinyl sheet were applied 15 minutes after the mastic was applied. A roller 6 inches (15 cm) wide and weighing 53 pounds (24 Kg) was applied to each of the samples. The roller supplied uniform pressure on all parts of the vinyl to evenly distribute the mastic. All samples were air-dried for about 24 hours before the peel-off tests. FIG. 1 shows the test panel after all test areas were prepared.

Figure 2:
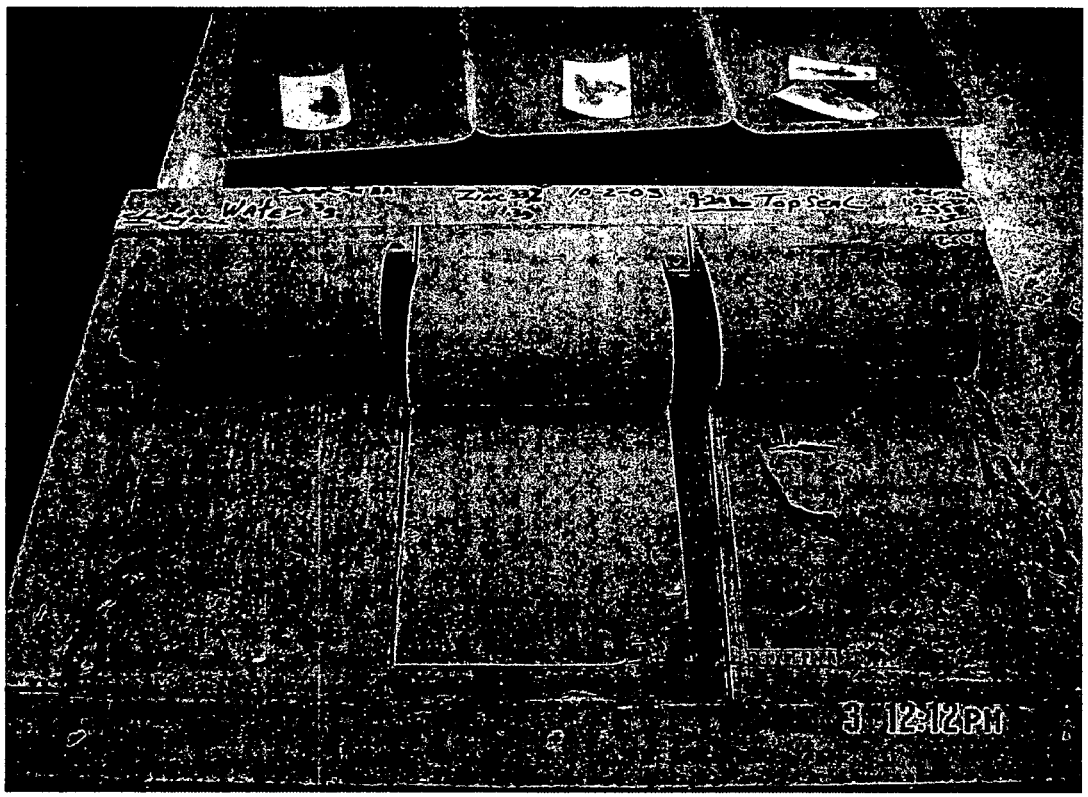
FIG. 2 shows Test Panel 1 and the results of the peel-off test of Examples 1-3.

When all samples were dry, peel-off tests were carried out to determine the ease with which the samples are removable from the underlayment. Upward pressure is applied by hand trying to separate the vinyl from the mastic and the underlayment. The upward force is increased until one of the bonds in the underlayment/mastic/vinyl system fails or until the system exceeds the strength of the tester. Weakest bonds fail first. If the bond between the underlayment and the mastic fails, the mastic will be attached to the vinyl. When the adhesion between the mastic and the vinyl is the weakest, the striped channels of the mastic are clearly visible and are attached to the underlayment. If failure occurs within the layers of the flooring sample, the mastic remains attached to the underlayment, but a portion of the flooring obscures the stripes of the mastic. Results of peel-off tests of Examples 1-3 are shown in FIG. 2.

Test area 1 using water only shows that none of the vinyl and only some of the mastic have adhered to the underlayment. Virtually none of the calcium sulfate hemihydrate was converted to the dihydrate, allowing the vinyl and mastic to easily separate from the matrix layer at the powdery layer. The zinc sulfate solution of the center sample shows improved adhesion. Delamination of the vinyl demonstrates good bonding between both the mastic and the underlayment and the mastic and the vinyl. Use of TOPSEAL sealant in Test Area 3 on the right shows some delamination of the vinyl, but in some areas the vinyl as separated cleanly from the mastic.

EXAMPLES 4-5

The coating of this invention, SE, was prepared using the components of Table III. The first two dry components were placed in a mixer and mixed for about 1½ minutes. The remaining components were then added to the mixture. Upon mixing, the resulting mixture was a white, free-flowing powder. The dry blend was then added to deionized water at a ratio of 1 part dry mixture to 4 parts water based on volume and mixed.

TABLE III

| Component | Source | Weight, grams |
|---|---|---|
| Zinc Sulfate | | 79.6 |
| Flowkit 51 Polymer | National Starch | 19.9 |
| Agitan P-823 | Ultra Additives, Inc. Paterson, NJ | 0.49 |
| Biocide | | 0.1 |
| Optical Brightener | | 0.1 |

A second test panel was prepared as described in Examples 1-3 above and divided into two test areas of approximately equal size. Samples of vinyl sheet were cut to fit within each test area. The TOPSEAL coating of example 3 was applied to the test area on the left of the panel, and is designated Example 4. Example 5 is shown on the right side of the test panel, where the SE coating was applied. Mastic was applied as described in Examples 1-3 above, and the two vinyl samples were pressed into the adhesive using the roller. Table VI summarizes the examples of Test Panel 2.

TABLE VI

| | TEST PANEL 2 | |
|---|---|---|
| | Example | |
| | 4 | 5 |
| Position on Test Panel 2 | Left | Right |
| Coating Type | TOPSEAL | SE |
| Coating Weight | 12 g/ft² (129 g/m²) | 12 g/ft² (129 g/m²) |

Figure 3:
FIG. 3 shows Test Panel 2 with results of the peel-off test of Examples 4 and 5.

Results of the peel-off tests are shown in FIG. 3. Example 4 is essentially a duplicate of Example 3. As discussed above, the striped yellow areas are sections where mastic is visible because there is virtually no adhesion. The coating of this invention, shown in Example 5, shows significant improvement in adhesion. Mastic is visible only down the right edge of the sample and a small area in the lower left corner. The SE formulation of Example 5 shows strong adhesion and delamination of the vinyl over virtually the entire sample.

Additional test panels were prepared using the method described above to make larger panels 4 ft×4 ft×1 in (1.2 m×1.2 m×2.5 cm). In Examples 6 and 7 that follow, the SE coating of Example 5 was tested with a variety of flooring samples to verify that the coating is effective with flooring of different composition and construction. Samples were prepared in the same manner described in Example 1 with one exception. Due to the larger sample size, a large, 3 Sectional 15 inch (37.5 cm) Floor Roller weighing 103 pounds (46.7 Kg) (Beno Gundlach Tools, Belleville, Ill.) was used to set the vinyl into the mastic. The SE coating was applied to a coating weight of 12 grams/ft² (129 g/m²).

EXAMPLE 6

Figure 4:
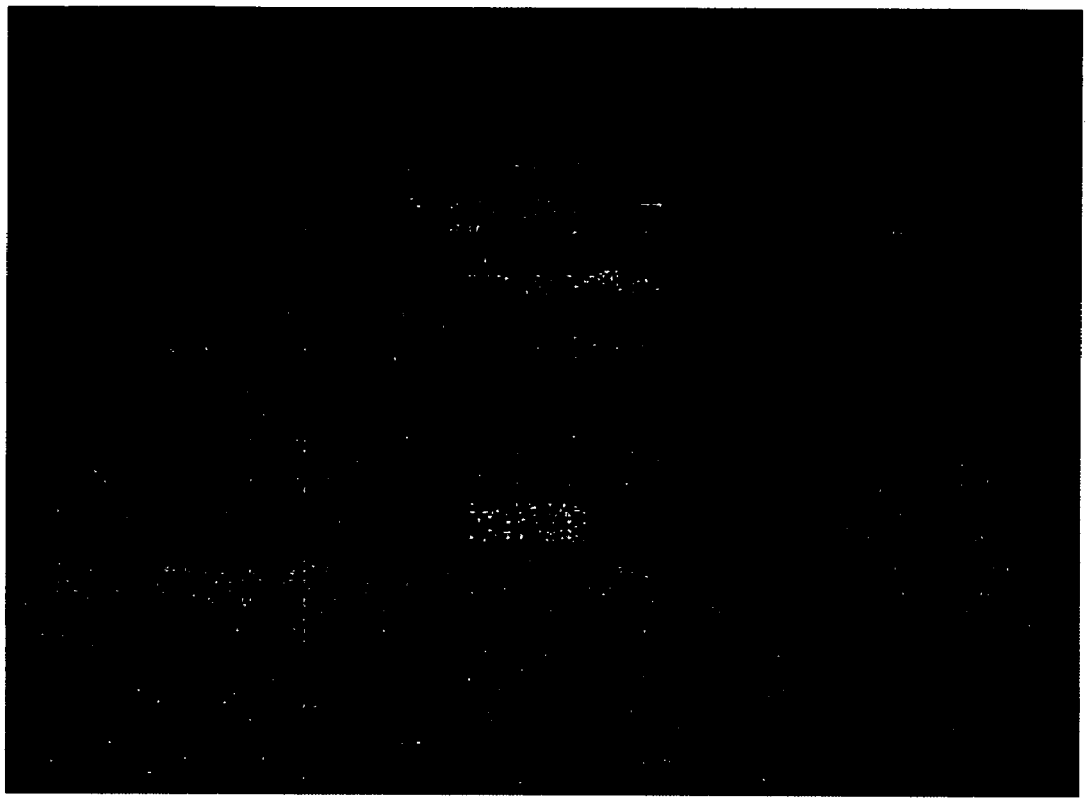
FIG. 4 shows Test Panel 3 and the results of the peel-off test of Example 6.
Figure 5:
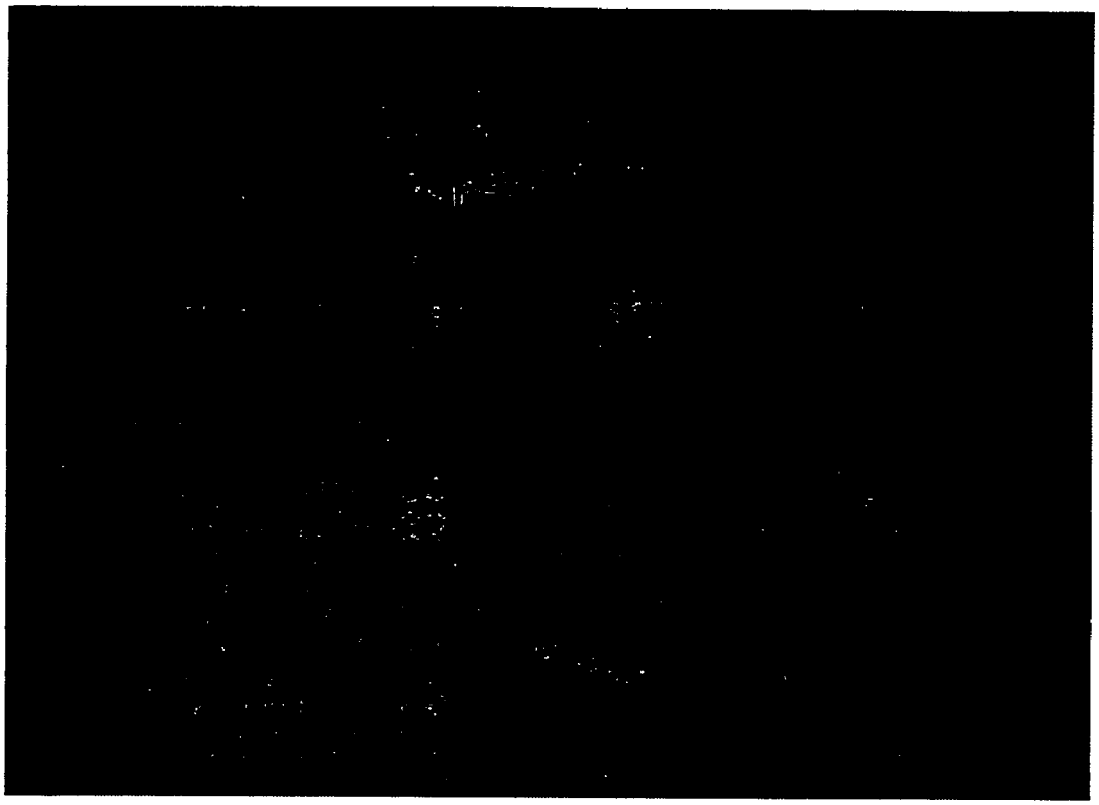
FIG. 5 shows Test Panel 4 and the results of the peel-off test of Example 7.

In Example 6, Mannington vinyl sheet flooring (Mannington Mills, Inc. Salem, N.J.) was applied to the mastic and allowed to dry for 24 hours. To minimize edge effects, a utility knife was used to remove a piece of the flooring, and manual force was applied to the vinyl to try to separate it from the underlayment. Results are shown in FIG. 4, revealing that the backing has adhered to the mastic and the vinyl has delaminated.

EXAMPLE 7

Example 6 was repeated using Congoleum vinyl sheet flooring (Congoleum Corporation, Mercerville, N.J.). Again, no mastic is visible because the vinyl has delaminated, indicating firm bonds of the mastic to the vinyl and to the underlayment.

EXAMPLE 8

Figure 6:
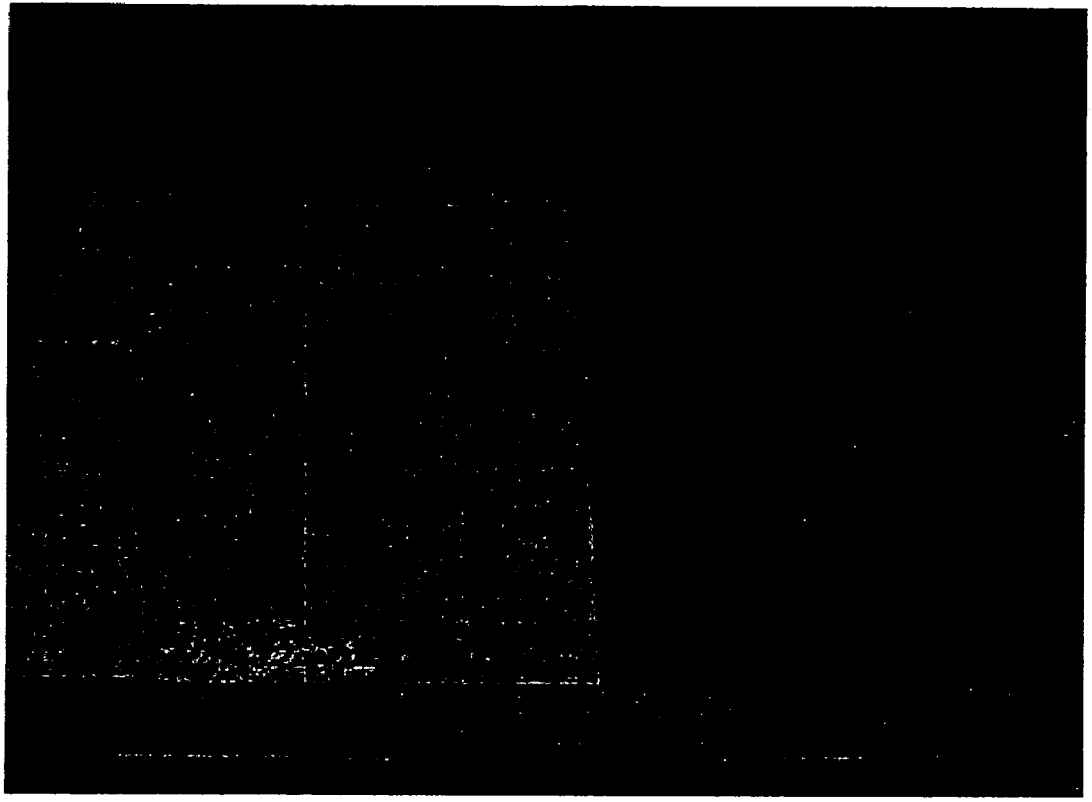
FIG. 6 shows Test Panel 5 and the results of the peel-off test of Example 8.

This example demonstrates the viability of using the SE coating together with a conventional sealant. A test panel was prepared as described in Example 6 above. The underlayment was first coated with 12 grams/ft² (129 g/m²) of the commercial SE formulation of Example 5 and allowed to dry for about 4 hours. Next, the underlayment was coated with about 10 grams/ft² (107 g/m²) of the commercial TOPSEAL sealant. When the TOPSEAL was completely cured, the mastic and samples of vinyl sheets were applied to the surface. FIG. 6 shows the very good adhesion of sheet vinyl even when both coatings are used together. The application of TOPSEAL sealant on top of the SE coating results in hardening of the gypsum surface, good adhesion and formation of a water barrier between the underlayment and the final flooring.

While a particular embodiment of the present invention has been shown and described, it will be appreciated by those skilled in the art that changes and modifications may be made thereto without departing from the invention in its broader aspects and as set forth in the following claims.

What is claimed is:

1. A coated floor underlayment prepared to receive a cross-linkable adhesive comprising:
   a floor underlayment comprising gypsum; and
   a coating applied to the surface of said underlayment comprising:
      a film-forming latex polymer;
      a surface enhancing agent selected to both accelerate the setting reactions of calcined gypsum and to cross-link the cross-linkable adhesive wherein the surface enhancing agent is selected from the group consisting of potassium sulfate, sodium sulfate, and a compound comprising a cation and an anion, wherein said cation is a divalent or trivalent metal ion and wherein said anion is selected from the group consisting of a sulfate, nitrate, and chloride ion; and
      a defoamer.

2. The coated floor underlayment of claim 1 wherein said floor underlayment comprises at least 50 weight % gypsum on a dry, aggregate-free solids basis.

3. The coated floor underlayment of claim 1 wherein said floor underlayment comprises up to 30 weight % cement on a dry, aggregate-free solids basis.

4. The coated floor underlayment of claim 1 wherein said surface enhancing agent is present in said coating in amounts of from about 50% to about 90% by weight on a dry, aggregate-free solids basis.

5. The coated floor underlayment of claim 1 wherein said floor underlayment further comprises aggregate particles.

6. The coated floor underlayment of claim 1 wherein said film-forming latex polymer is at least one of a polyacrylic resins and a vinylacetate copolymer.

7. The coated floor underlayment of claim 1 wherein said surface enhancing agent is selected from the group consisting of magnesium sulfate, copper sulfate, ferrous sulfate, ferric sulfate and aluminum sulfate.

8. A multi-layer floor underlayment comprising:
   the coated floor underlayment of claim 1; and
   said cross-linkable adhesive.

9. The underlayment of claim 8 wherein said surface enhancing agent comprises zinc sulfate.

\* \* \* \* \*